July 2, 1940.  M. K. TAYLOR  2,206,472
BALANCING OF ROTATING BODIES
Filed Sept. 14, 1938

M. K. Taylor
Inventor
By: Glascock Downing & Seebold
Attys.

Patented July 2, 1940

2,206,472

UNITED STATES PATENT OFFICE 2,206,472

BALANCING OF ROTATING BODIES

Maurice Kenyon Taylor, Hollinwood, England, assignor to Ferranti Electric Inc., New York, N. Y.

Application September 14, 1938, Serial No. 229,943
In Great Britain September 23, 1937

4 Claims. (Cl. 74—573)

This invention relates to the balancing of rotating bodies and has particular application to any of the methods of producing dynamic balance in a rotating body described in Patent No. 2,012,780.

In balancing a body which is rotating at a high speed, projecting masses added for the purpose of balancing are likely to cause eddies to be formed in the surrounding air with a consequent dissipation of energy from the rotating body which dissipation may decrease the speed attained by the rotating body.

An object of the present invention is to provide an improved method of balancing a rotating body which substantially avoids the above objection.

An advantage of the invention is that it enables better balance to be obtained by reducing forces due to windage, and by allowing the rotating body to rotate at a speed which is not limited by windage acting on balancing masses.

According to the present invention, a ring of material is applied to a rotor, e. g. by being embedded therein and at least three masses of different specific gravity from that of said material are embedded in the ring, the masses being located in the individual planes containing the longitudinal axis of the rotor, the angle between any two adjacent planes being less than 180° and the circle of rotation of every individual mass being non-coincident with the circle of rotation of any other of said masses and the envelopes of all sections containing the longitudinal axis of the rotor thus equipped being the same.

Referring to the accompanying diagrammatic drawing.

Figure 3:
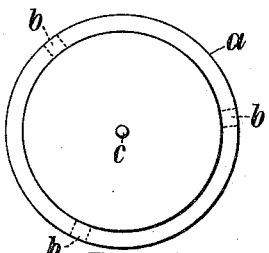
Figure 8:
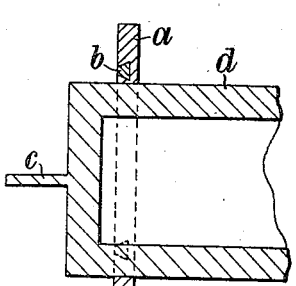
Figure 9:
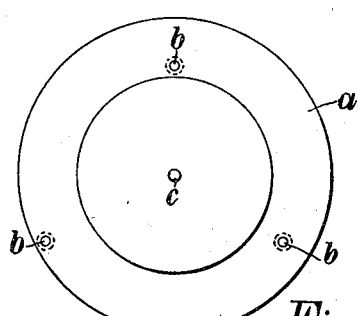

Figure 3 being an end view thereof;

Figures 4, 5, 6, 7 and 8 show in vertical longitudinal section parts of further modified arrangements;

Figure 9 being an end view of the arrangement of Figure 8.

Figure 1:
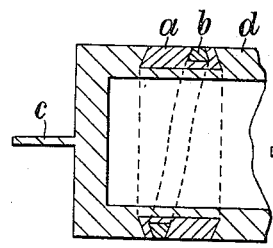
Figure 1 shows in vertical longitudinal section part of a drum furnished with material enabling the present invention to be carried into effect in one way.

In carrying the invention into effect according to one form by way of example shown in Figure 1, as applied to the balancing of a drum $d$, say a flyer of a textile spinning machine, a wide circumferential groove of dove-tail cross-section is formed in the drum. A ring $a$ of an aluminium alloy is die-cast into the wide groove and is automatically keyed in position by its corresponding dove-tail section; the surface of the ring is preferably made flush with the surface of the flyer. A further groove of dove-tail cross-section but forming a single turn spiral is either die-cast or cut in the ring $a$, the radial depth of the further groove being less than the radial depth of the ring, and a spiral $b$ of lead is die-cast into the further groove, its surface being substantially flush with the surface of the ring $a$ and of the drum $d$.

When the drum is rotated at high speed about its pivot $c$, balance may be obtained by any of the methods described in Patent No. 2,012,780. Application of a cutting tool to the spiral of lead $b$ results in the simultaneous removal of some aluminium alloy $a$, but because of the different specific gravities of the lead and the aluminium alloy, balance is attained as therein described. Since the surface of that portion of the drum carrying the balance material is effectively unbroken, no eddies are set up in the surrounding air, and the power required to rotate the drum at a given speed is reduced or alternatively the speed attained by the drum is increased for a particular input power.

Materials other than aluminium alloy and lead may be employed for the ring and balance material respectively. The wide groove may for example be filled by a synthetic moulding material such as is comprehended within the term plastics but it is essential that the specific gravity of the material in the wide groove should be different from that of the balance material.

Figure 2:
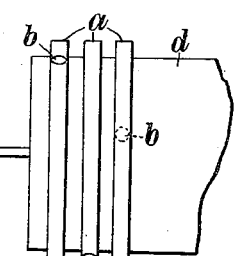
Figure 2 shows in elevation part of a modified arrangement.

In a modification illustrated in Figures 2 and 3, the balance material is applied in other shapes than in a spiral, that is to say, lead inserts $b$ are applied to rings $a$ of aluminium alloy, the inserts being located in the manner described in Patent No. 2,012,780.

Figure 4:
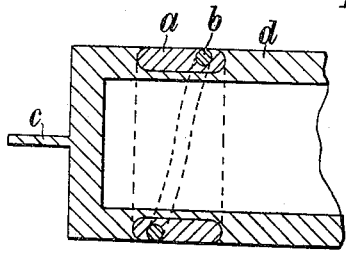
Figure 5:
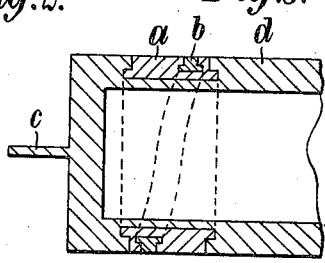

In other modifications illustrated in Figures 4 and 5, the shapes of the grooves are other than of dove-tail section, but are of such a section as to give a keying action of the aluminium alloy to the flyer and of the lead to the aluminium alloy.

The mode of attaching the aluminium rings of Figure 1, 4 or 5 may be used with any of the three modes of attachment of the lead rings of Figure 1, 4 or 5.

Figure 6:
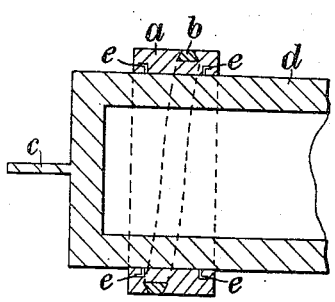

In another modification illustrated in Figure 6, a cylinder $a$ of aluminium is die-cast around a suitable portion of the drum $d$, the aluminium being keyed to the drum by means of tongues $e$ formed on the drum and held within the die-casting. A suitably shaped groove, e. g. spiral, is formed in the circumferential surface of the aluminium as described above and lead $b$ is die-cast into the groove so formed. The balancing process is carried out as before. This modification is useful where there is insufficient thickness of material in the body of the member being balanced to enable a groove to be cut in it.

Figure 7:
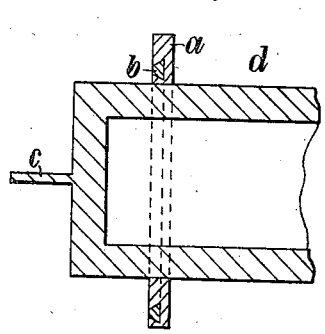

In a further modification illustrated in Figure 7, a cylinder $a$ of aluminium is provided as in the preceding modification but the spiral shaped groove is formed in one of the annular faces of the aluminium cylinder.

In a further modification illustrated in Figures 8 and 9, an aluminium cylinder $a$ provided as in the preceding example is furnished with three inserts $b$ of lead located in the manner described in Patent No. 2,012,780.

In all the modifications of Figures 6, 7, 8 and 9 the cross-section of the groove or of the inserts instead of being dove-tailed as shown may be as shown in either of Figures 4 or 5.

In Figures 1, 2, 4, 5, 6, 7 and 8, one end only of a drum is shown, the other end of the drum (not shown) being similarly equipped.

In all cases the surfaces of the two materials are made flush so as to avoid the formation of air eddies.

I claim:

1. Means in the form of a solid of revolution for dynamically balancing a body during its rotation about its axis comprising material encircling and rigid with said body and three masses of density different from that of the material embedded within said material, which masses are located in individual planes containing the longitudinal axis of the body, the angle between any two adjacent planes is less than 180° and the circle of rotation of very individual mass is non-coincident with the circle of rotation of any other of said masses.

2. Means in the form of a solid of revolution for dynamically balancing a body during its rotation about its axis comprising material encircling and rigid with said body and three masses of density different from that of the material embedded within said material, which masses are located in individual planes containing the longitudinal axis of the body, the angle between any two adjacent planes is less than 180° and the circle of rotation of every individual mass is non-coincident with the circle of rotation of any other of said masses and wherein said embedded masses together constitute a non-planar helical member.

3. Means in the form of a solid of revolution for dynamically balancing a body during its rotation about its axis comprising three annuli encircling and rigid with said body and a mass of density different from that of the annuli embedded in each annulus which masses are located in individual planes containing the longitudinal axis of the body, the angle between any two adjacent planes is less than 180° and the circle of rotation of every individual mass is non-coincident with the circle of rotation of any other of said masses.

4. Means in the form of a solid of revolution for dynamically balancing a body during its rotation about its axis comprising material encircling and rigid with said body and three masses of density different from that of the material embedded within said material, which masses are located in individual planes containing the longitudinal axis of the body, the angle between any two adjacent planes is less than 180° and the circle of rotation of every individual mass is non-coincident with the circle of rotation of any other of said masses and wherein said embedded masses lie in flat-spiral disposition.

MAURICE KENYON TAYLOR.